June 26, 1956 A. E. BRICKMAN Re. 24,172

TRANSLOAD DEVICE

Original Filed Nov. 24, 1948 2 Sheets-Sheet 1

INVENTOR.

ALAN E. BRICKMAN

BY

Donald G. Dalton

ATTORNEY

June 26, 1956 A. E. BRICKMAN Re. 24,172

TRANSLOAD DEVICE

Original Filed Nov. 24, 1948 2 Sheets-Sheet 2

INVENTOR.
ALAN E. BRICKMAN
BY
Donald G. Dalton
ATTORNEY

United States Patent Office

Re. 24,172

Reissued June 26, 1956

24,172

TRANSLOAD DEVICE

Alan E. Brickman, Williamsville, N. Y., assignor to United States Steel Corporation, a corporation of New Jersey Original No. 2,642,789, dated June 23, 1953, Serial No. 61,876, November 24, 1948. Application for reissue June 22, 1955, Serial No. 517,408

5 Claims. (Cl. 94—8)

Matter enclosed in heavy brackets [ ] appears in the original patent but forms no part of this reissue specification; matter printed in italics indicates the additions made by reissue.

This invention relates to a transload device and more particularly to such a device for use in pavement joints, concrete highways, airport runways and the like. Such devices are quite commonly used to carry the load between adjacent slabs of concrete, but those transload devices now in common use have various drawbacks. They may be difficult to assemble, or their cost may be excessive. In some instances, the device is so constructed that it is difficult or impossible to flow or pack the concrete solidly around the dowel adjacent the joint.

It is therefore an object of my invention to provide a transload device which is inexpensive and is easily fabricated by welding the various parts together.

Another object is to provide such a device made of two units which can be easily assembled by telescoping the units together.

Still another object is to provide a transload device which enables the concrete to flow or be packed solidly around the dowel adjacent the joint.

These and other objects will be more apparent after referring to the following specification and attached drawings, in which:

Figure 3 is an enlarged sectional view of a detail;

Figure 4 is an elevation of a detail;

Figure 4A is a view taken on the line IV–A—IV–A of Figure 4; and

Figure 1:
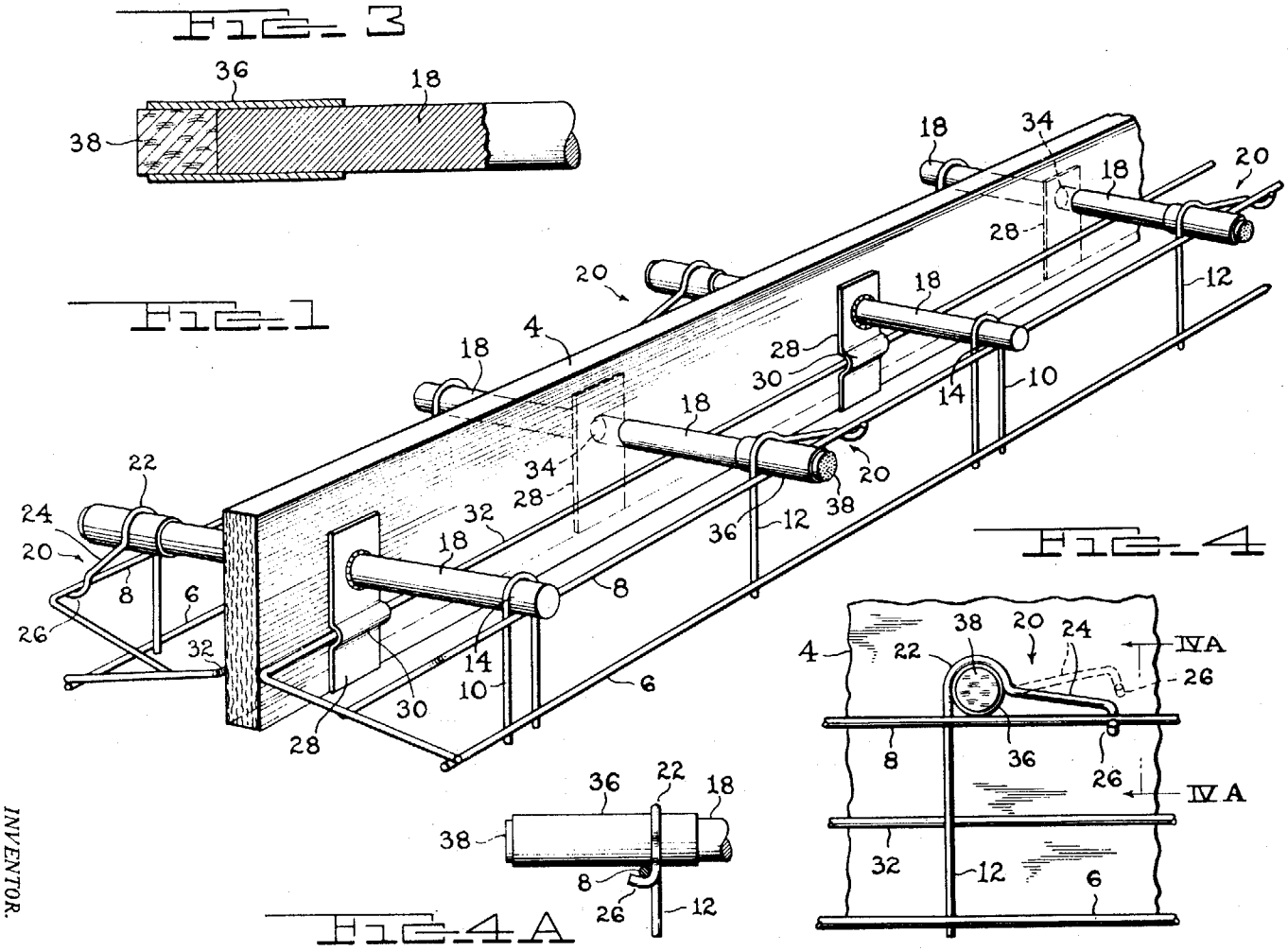
Figure 1 is a perspective view of an expansion joint assembly.
Figure 2:
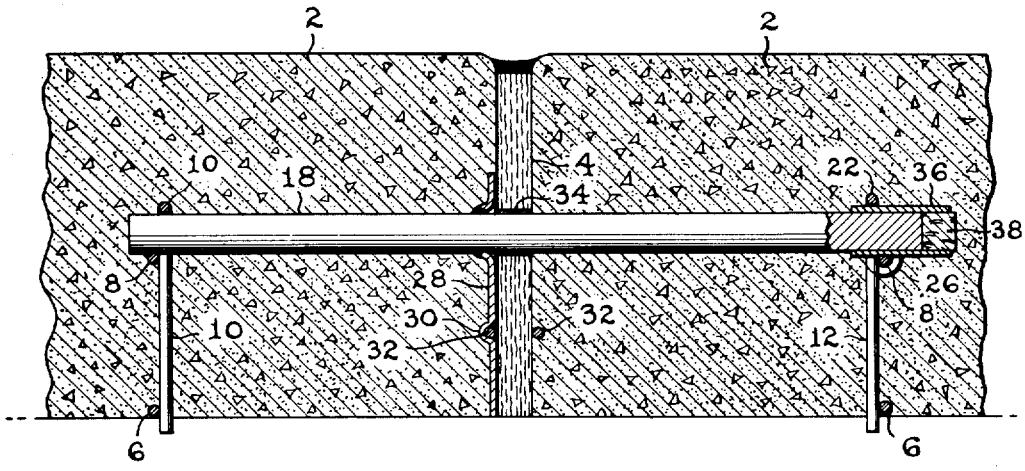
Figure 2 is a transverse section of the expansion joint of Figure 1.

Referring more particularly to the drawings the reference numeral 2 indicates a pair of concrete slabs having the usual filler member 4 therebetween. My device is made of two complementary units which are telescoped together. Each unit has two longitudinal rods 6 and 8 spaced from the filler 4 and connected by rods 10 and 12 which are welded thereto. Rod 10 is U-shaped with the open end of the U being welded to the lower wire 6 and the closed part of the U extending above and being welded to the top wire 8, thus providing an opening 14. A dowel 18 extends into the opening 14 and is welded to the rods 8 and 10. The rod 12 has a vertical portion, the lower end of which is welded to the rod 6, and a top portion which forms a clamping device 20. The clamping device, as best shown in Figure 4, is provided with a loop 22 for receiving the free end of the dowel 18 and a longitudinal portion 24 which extends along the rod 8. The free end of the portion 24 has a hook 26 which is adapted to pass below and extend around the rod 8 to a point just below the axis of the rod. The rods 10 and 12 are arranged alternately with the rods 10 of one unit being opposite the rods 12 of the other unit. A plate 28 is welded to each of the dowels 18 on that side of the filler 4 adjacent the rod 10. The plates 28 are bent at 30 to receive a longitudinal rod 32 which is welded to the plates 28 and extends the length of the joint. As shown in Figure 1, the end of rod 32 is bent toward rod 6 to which it is welded and the end of rod 8 is bent downwardly and welded to the bent portion of rod 32. Holes 34 are provided in the filler 4 for passage of the dowels, the free ends of the dowels having sleeves 36 telescoped thereover. An expansible filler 38 is provided in the sleeve 36 at the outer end thereof.

In assembly, the two units are brought together by passing the free ends of the dowels through the openings 34 into the loops 22. The sleeves 36 and fillers 38 are then applied to the dowels and the hook 26 is moved from the dotted line position of Figure 4 to the full line position, thus locking the two units together with the plates 28 bearing against opposite sides of the filler 4 to hold it in position while concrete is poured. The plates 28 do not interfere with the flow or packing of the concrete around the dowels adjacent the joint, thus making it possible to provide dense concrete at the most critical places. The device functions in the usual manner as the concrete slabs 2 expand and contract.

Figure 5:
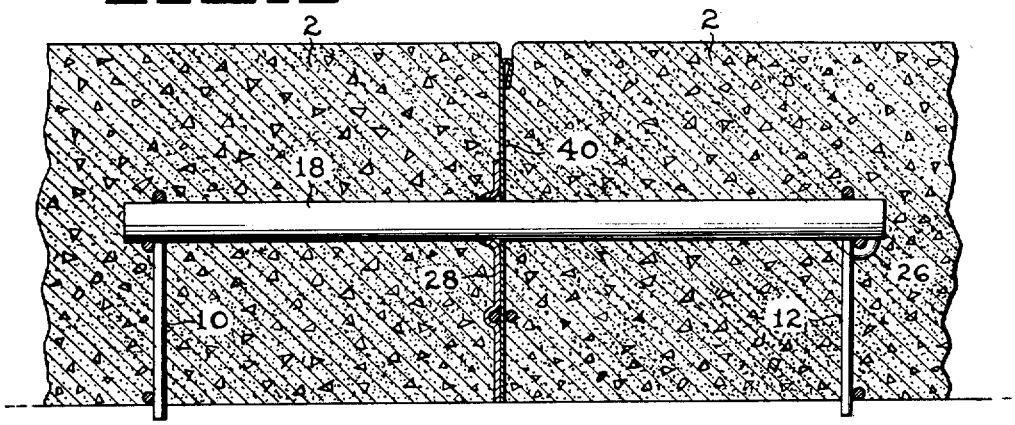
Figure 5 is a view similar to Figure 2, but showing a contraction joint 1.

Figure 5 shows my device as applied to a contraction joint. The only differences in the two joints are the omission of the sleeves 36 and filler 38 in the contraction joint and the substitution of a steel separating plate or filler 40 for the expansible filler 4.

While two embodiments of my invention have been shown and described it will be apparent that other adaptations and modifications may be made without departing from the scope of the following claims.

I claim:

1. In a transload device for adjacent slabs having a filler therebetween, the combination including a pair of telescoping supporting units, one adapted to be positioned on each side of the filler, each unit comprising a pair of outboard longitudinal rods spaced apart one above the other, spaced apart rods extending between and welded to said longitudinal rods, said last named rods having a U-shaped upper portion extending above the upper longitudinal rod to form an opening, a dowel passing through each opening and welded to the walls thereof, a plate welded to each of said dowels and adapted to bear against one side of said filler, each of said plates being bent outwardly below said dowel to provide a longitudinally extending recess therein, an inboard rod welded to and extending longitudinally between the plates, said last named rod being positioned in said recesses above the bottom of said plates a substantial distance below the dowel, a clamping rod between adjacent pairs of said U-shaped rods extending between and welded to the bottom and top longitudinal rods, each of said clamping rods extending above the top longitudinal rod and having a loop receiving a dowel of the opposite unit, each of said clamping rods extending from said loop along said top longitudinal rod and having a hook portion at the free end which passes below and around the top longitudinal rod, and a connection between the ends of the inboard longitudinal rod and one of the outboard longitudinal rods.

2. In a transload device for adjacent slabs having a filler therebetween, the combination including a pair of telescoping supporting units, one adapted to be positioned on each side of the filler, each unit comprising a pair of outboard longitudinal rods spaced apart one above the other, spaced apart rods extending between and welded to said longitudinal rods, said last named rods having a U-shaped upper portion extending above the upper longitudinal rod to form an opening, a dowel passing through each opening and welded to the walls thereof, sleeves telescoped over the free end of the dowels, a plate welded to each of said dowels adjacent said filler, each of said plates being bent outwardly below said dowel to provide a longitudinally extending recess therein, an inboard rod welded to and extending longitudinally between the plates, said last named rod being positioned in said recesses above the bottom of said plates a substantial distance below the dowel, a clamping rod between adjacent pairs of said U-shaped rods extending between and welded to the bottom and top longitudinal rods, said clamping rod extending above the top longitudinal rod and having a loop receiving the sleeves of the opposite unit, said clamping rod extending from said loop along said top longitudinal rod and having a hook portion at the free end which passes below and around the top longitudinal rod, and a connection between the ends of the inboard longitudinal rod and one of the outboard longitudinal rods.

3. In a transload device for adjacent slabs, the combination including a pair of outboard longitudinal rods spaced apart one above the other, spaced apart rods extending between and welded to said longitudinal rods, said last named rods having a U-shaped upper portion extending above the upper longitudinal rod to form an opening, a dowel passing through each opening and welded to the walls thereof, a vertical plate welded to said dowels intermediate the length thereof, a clamping rod between adjacent pairs of said U-shaped rods having a vertical portion extending between and welded to the bottom and top longitudinal rods, each of said clamping rods extending above the top longitudinal rod and having a loop for receiving a dowel therein, said loop extending from said vertical portion with its free end above the top longitudinal rod, each of said clamping rods extending from the free end of its loop downwardly along said top longitudinal rod and having a hook portion at the free end adapted to pass below and around the top longitudinal rod.

4. In a transload device for adjacent slabs, the combination including a pair of outboard longitudinal rods spaced apart one above the other, spaced apart rods extending between and welded to said longitudinal rods, said last named rods having a U-shaped upper portion extending above the upper longitudinal rod to form an opening, a dowel passing through each opening and welded to the walls thereof, a plate welded to each of said dowels intermediate their length, each of said plates being bent outwardly a substantial distance below said dowel to provide a longitudinally extending recess therein, an inboard rod welded to and extending longitudinally between the plates, said last named rod being positioned in said recesses, a clamping rod between adjacent pairs of said U-shaped rods extending between and welded to the bottom and top longitudinal rods, each of said clamping rods extending above the top longitudinal rod and having a loop for receiving a dowel, each of said clamping rods extending from said loop along said top longitudinal rod and having a hook portion at the free end adapted to pass below and around the top longitudinal rod.

*5. In a transload device for adjacent slabs, the combination including two pairs of outboard longitudinal rods, the rods in each pair being spaced apart one above the other, spaced apart rods extending between and welded to the longitudinal rods of each pair of rods, each of said last named rods having a U-shaped upper portion extending above the upper longitudinal rod to form a closed loop, a dowel passing through each closed loop with one end welded to the walls thereof, a clamping rod between adjacent pairs of said U-shaped rods and in alignment with the U-shaped rod attached to the opposite pair of longitudinal rods, each of said clamping rods extending between and welded to the longitudinal rods of each pair of rods, each of said clamping rods extending above the top longitudinal rod and having a loop receiving the dowel welded to the aligned U-shaped rod, each of said clamping rods extending from said last named loop along said top longitudinal rod and having a hook portion at the free end passing below and around the top longitudinal rod.*

References Cited in the file of this patent or the original patent

UNITED STATES PATENTS

| | | |
|---|---|---|
| 1,735,592 | White | Nov. 12, 1929 |
| 1,772,653 | White | Aug. 12, 1930 |
| 1,830,883 | Nester | Nov. 10, 1931 |
| 2,245,972 | Friberg | June 17, 1941 |
| 2,309,767 | Heltzel | Feb. 2, 1943 |
| 2,319,050 | Fischer | May 11, 1943 |

OTHER REFERENCES

Roads and Streets, November 1947, page 1.